Oct. 11, 1955 H. G. HELVEY, JR., ET AL 2,720,415

RAIN VISOR

Filed Dec. 2, 1952 2 Sheets-Sheet 1

INVENTORS

Henry G. Helvey Jr. and Cleveland H. Hendrick

BY

Mason, Fenwick & Lawrence

ATTORNEYS

RAIN VISOR
Filed Dec. 2, 1952 2 Sheets-Sheet 2
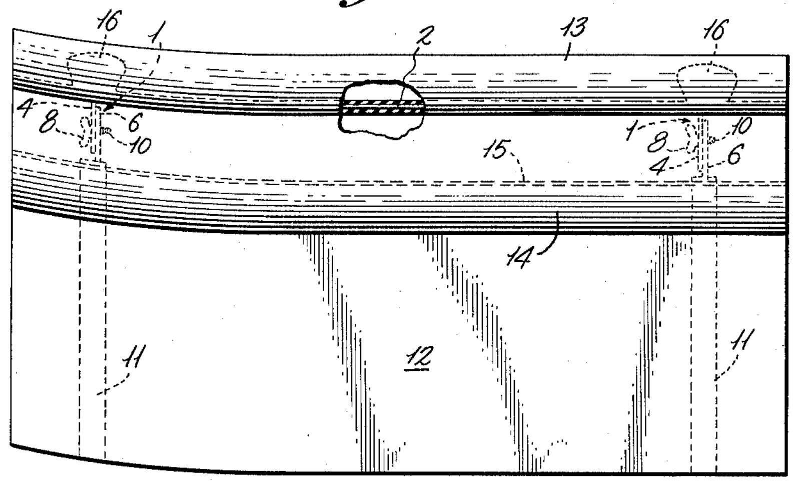
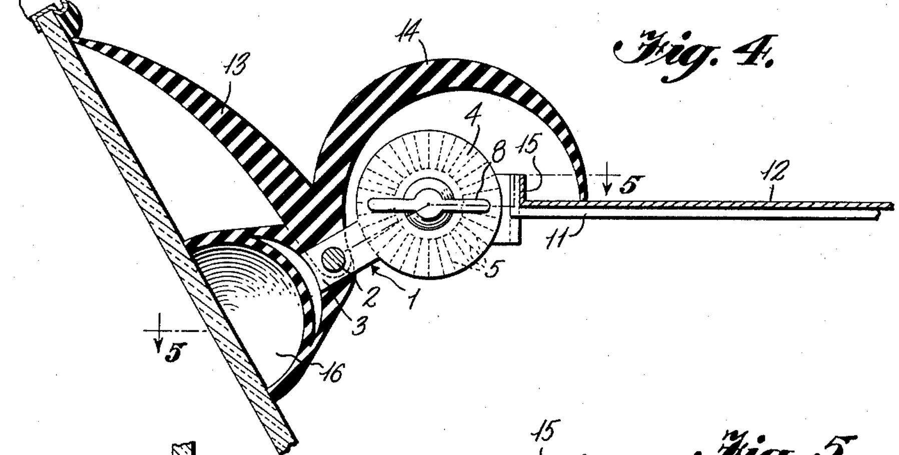
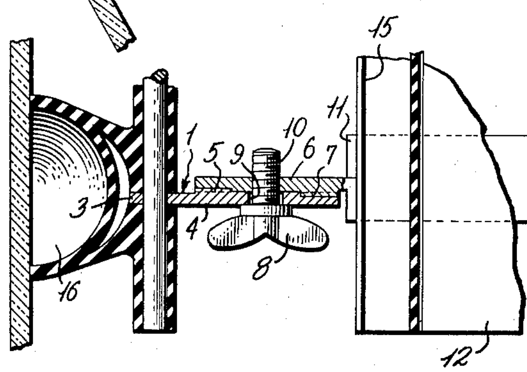
INVENTORS
Henry G. Helvey Jr. and
Cleveland H. Hendrick
BY Mason, Fenwick & Lawrence
ATTORNEYS United States Patent Office 2,720,415

Patented Oct. 11, 1955

2,720,415

RAIN VISOR

Henry G. Helvey, Jr., and Cleveland H. Hendrick, Roanoke, Va.

Application December 2, 1952, Serial No. 323,553

5 Claims. (Cl. 296—95)

This invention relates to visors for automobile windshields, and more particularly to such visors which may be affixed to the windshields only when needed.

Although drive-in theatres, where a patron remains seated in his own car to view a performance, have become increasingly popular, it has been practically impossible to watch a performance in inclement weather. Rain falling on the windshield of the car will obscure the vision of the occupants. The windshield wipers of most cars are operated upon a vacuum principle and, therefore, cannot operate when the car engine is not running. The electrical wipers are too much of a drain on the car battery to operate over an extended period without running the engine. It is impractical to run the engine during an entire performance. Consequently these open air theatres are not patronized during bad weather.

The object of the present invention is to provide a visor which may be quickly attached to the windshield of the car to keep the windshield perfectly dry during rainy weather, so that the occupants of the car may have clear vision.

Another object of the invention is to provide such a visor which may be adjusted angularly to adapt it to the particular slope of the windshield on which it is used.

A further object of the invention is to provide a visor of this type which will seal around the top edge of the windshield to preclude the possibility of any water running down over the windshield in the line of vision of the occupants of the car.

Other objects of the invention will become apparent from the following description of a practical embodiment thereof, when taken in conjunction with the drawings which accompany, and form a part of, this specification.

In the drawings:

Fig. 3 is a top plan view of the rain visor;

Fig. 4 is an enlarged, detailed vertical section through a portion of the visor, and is taken substantially on the line 4—4 of Fig. 1; and Fig. 5 is a fragmentary horizontal section taken on line 5—5 of Fig. 4.

Figure 1:
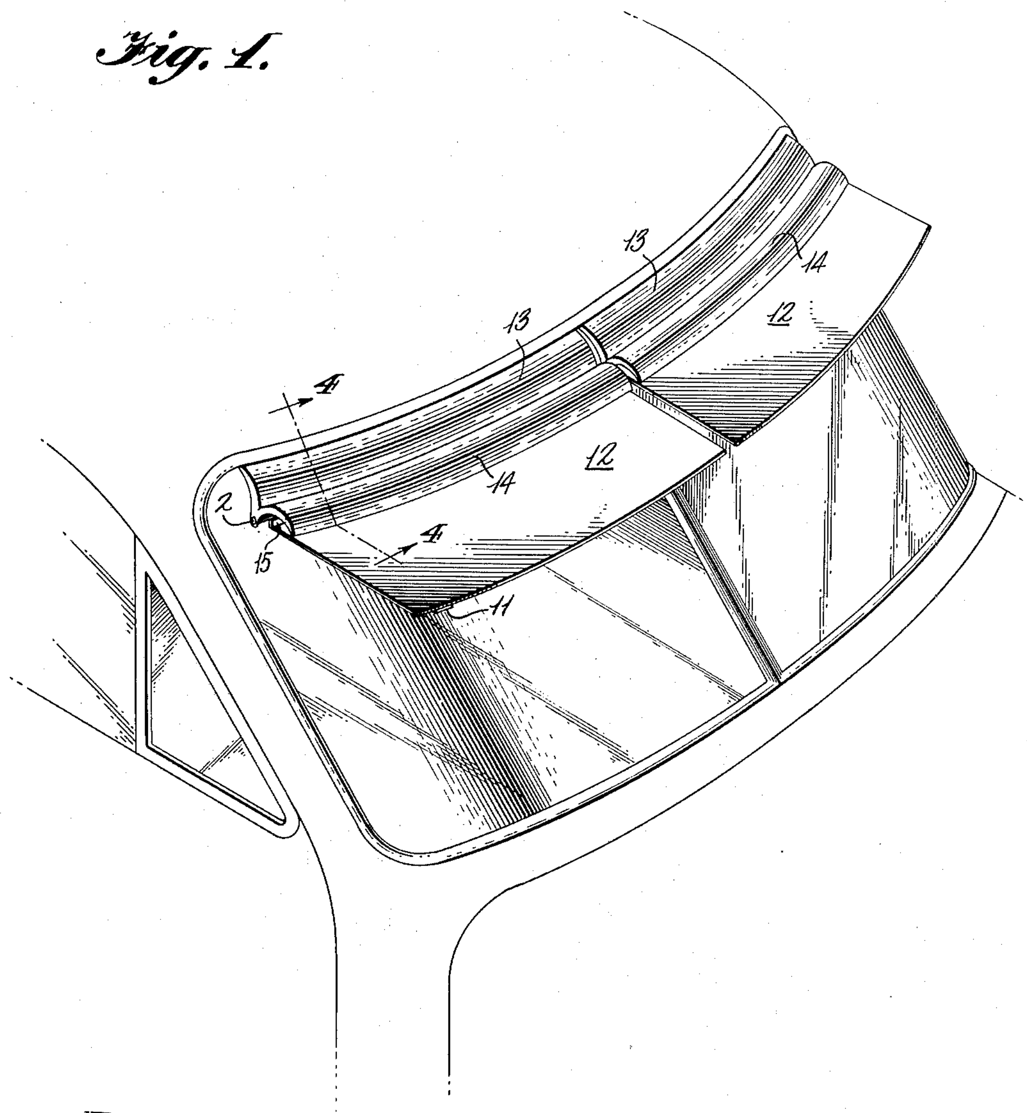
Fig. 1 is a perspective view of a portion of an automobile showing two visors embodying the inventive concept secured in place upon the windshield.
Figure 2:
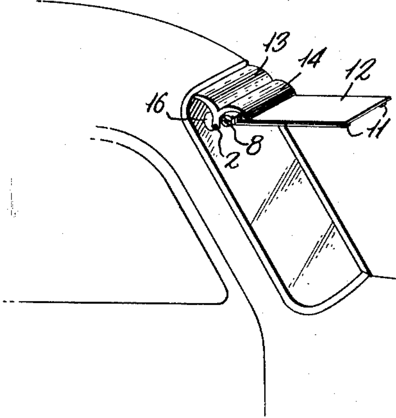
Fig. 2 is a side elevation of a portion of an automobile showing a visor attached to the windshield.

In general, the invention comprises a rain visor which may be quickly attached to, or removed from, the windshield of an automobile to prevent the accumulation of water upon the windshield when the car is stationary. The visor is angularly adjustable and is provided with means to seal against the top edge of the windshield and also means to seal the hinge about which the visor may be moved for purposes of adjustment.

Referring to the drawings in detail, the visor is formed upon a mounting frame 1, which includes a rod 2 of a length equal to that desired for the visor. Near either end, the rod has secured to it an arm 3 which extends forwardly at right angles to the axis of the rod. The free end of each of these arms is enlarged to form a circular clamping member 4. One face of each of the clamping members will be serrated to form a plurality of spaced radially extending teeth 5. Companion clamping members 6 having matching teeth 7 are provided, the toothed faces of the members 6 being mounted for engagement with the respective serrated faces of the members 4. Each pair of clamping members are held in engagement with one another by means of a screw 8. The clamping members 4 are apertured at their centers as at 9, the opening being sufficiently large to permit free passage of the shank of screw 8 through it. The opening 10 in the clamping member 6 is threaded to receive the threaded portion of the shank of the screw. As shown on the drawings, the screws are of the wing type, and when screwed tightly in place the toothed faces of the members 4 and 6 will be held in clamping engagement to prevent relative rotation of the two members. By backing off the screw the two members can be separated and the clamping member 6 may be rotated on the screw so that the angular relationship of the two members may be changed.

Each of the two clamping members 6 carries a bracket 11 which extends forward a substantial distance from its member 6 and forms a support for the visor proper 12 which is attached to the brackets. The visor may be of metal, plastic or any other suitable sheet material. It is approximately the length of the rod 2, and wide enough to extend sufficiently in front of the windshield to prevent rain from falling on the windshield.

The rod 2 of the mounting frame is encased in rubber, and, as the rubber is molded, it is formed to provide a rearwardly projecting wing 13 and a forwardly projecting wing 14. Each of these wings tapers from a root of substantial thickness adjacent the rod 2 to a relatively thin sealing lip at its free edge. The wings are flexible, and the thin sealing lips will conform readily to the surface against which they are to seal. Each of the wings is arcuate from its root to its sealing lip. The rearwardly projecting wing is adapted to contact the windshield of the car directly below the bead at the top of the windshield. The forwardly projecting wing arches over the clamping members and its lip contacts the top surface of the visor 12. When the device is assembled, the wing 14 is under sufficient tension so that it will follow the visor and remain in close contact with it in all positions of adjustment of the visor. It will be noted from Figure 4 of the drawing that the rear edge of the visor is turned upwardly to form an upstanding flange 15, so that if any water should pass between the sealing lip of the wing 14 and the visor it will be deflected to the sides and will not drip down onto that portion of the windshield directly beneath the visor.

In order to attach the visor to the windshield, suction cups are provided which are formed integrally with the wings 13 and 14. Preferably these cups 16 are positioned directly in line with the arms 3 of the mounting frame so that pressure upon the arms will be transmitted directly to the suction cups to facilitate compressing the cups to attach them to the windshield.

It, of course, is not necessary that the cups be in line with the arms 3 as the rod 6 makes the device sufficiently rigid to back up the cups no matter where they are placed along the rod. Obviously more than two cups may be used if necessary.

In use, two of the visors will probably be employed on each car, one on each side of the windshield. The actual shape of the visor 12, and the contour of the lip of the wing 13 will vary in accordance with the contour and type of windshield. When the rain visor is to be attached it is placed against the windshield with the lip of the wing 13 in tight abutment with the bead around the top edge of the windshield. The operator will then press inwardly on the arms 3 to depress the vacuum cups 16 against the windshield. This is all that is required to mount the device. The screws 8 may be loosened, and the angle of the visor adjusted if needed. The performance may then be viewed by the occupants of the car in rainy weather without the necessity for running the car engine throughout the performance to supply power for operating the windshield wipers.

It will be obvious that a single visor may be provided to extend completely across the windshield, but by using two, the visors will be smaller and may be handled and stored more conveniently.

Although one practical embodiment of the invention has been disclosed herein, it will be understood that the precise structure shown and described is merely for purposes of illustration, and changes may be made within the scope of the apended claims.

What is claimed is:

1. A rain visor for automobile windshields comprising, a mounting frame including a rod and spaced arms projecting at right angles from said rod, clamping members carried by said arms, companion clamping members rotatably mounted on the clamping members carried by the arms for adjustment relative thereto, means to hold the clamping members and companion clamping members in selected positions of adjustment, a visor rigidly connected to said companion clamping members, a rubber wing having a sealing lip to engage the windshield and a rubber wing having a sealing lip to engage the upper surface of said visor, both said wings being integral with one another and moulded to encase said rod, and suction cups moulded integrally with said wings and projecting at right angles to said rod for attaching the rain visor to a windshield.

2. In a rain visor for automobile windshields as claimed in claim 1, said visor having an upstanding flange along its rear edge, said flange being between the connection of said clamping members to said companion clamping members and the line of contact of the sealing lip of the wing contacting said visor.

3. A rain visor for automobile windshields comprising, a mounting frame including a rod, a visor hingedly connected to said mounting frame for vertical angular adjustment, a rubber wing having a rearwardly extending sealing lip to engage the windshield and a rubber wing having a forwardly extending sealing lip to engage the upper surface of said visor, both said wings being integral with one another and molded to encase said rod, and suction cups molded integrally with said wings and projecting at right angles to said rod for attaching the rain visor to a windshield.

4. A rain visor for automobile windshields as claimed in claim 3, said wings having thick roots adjacent said rod and tapering to a thin sealing lip.

5. In a rain visor for automobile windshields as claimed in claim 3, means to hold the visor in selected positions of adjustment.

References Cited in the file of this patent

UNITED STATES PATENTS

| | | |
|---|---|---|
| 1,119,177 | Krafft | Dec. 1, 1914 |
| 1,204,122 | Bowman | Nov. 7, 1916 |
| 1,413,683 | Ramsey | Apr. 25, 1922 |
| 1,467,766 | Meadows | Sept. 11, 1923 |
| 1,763,603 | Donahue | June 10, 1930 |